US006807559B1

(12) United States Patent
Budhiraja (10) Patent No.: US 6,807,559 B1
(45) Date of Patent: Oct. 19, 2004

(54) SYSTEM AND METHOD FOR APPLET MANAGEMENT

(75) Inventor: Suresh Budhiraja, Bellevue, WA (US)

(73) Assignee: Attachmate Corporation, Bellevue, WA (US)

(*) Notice: Subject to any disclaimer, the term of this patent is extended or adjusted under 35 U.S.C. 154(b) by 0 days.

(21) Appl. No.: 09/544,518

(22) Filed: Apr. 6, 2000

(51) Int. Cl.[7] .......................... G06F 15/16; G06F 9/445
(52) U.S. Cl. ..................... 709/203; 709/219; 717/172; 717/173
(58) Field of Search .............................. 709/201, 203, 709/217, 219, 223; 717/169, 118, 165, 166, 171, 172, 173, 174, 175, 176, 177, 178

(56) References Cited

U.S. PATENT DOCUMENTS

| | | | | |
|---|---|---|---|---|
| 5,784,583 A | * | 7/1998 | Redpath | 345/841 |
| 5,909,684 A | * | 6/1999 | Nelson | 709/201 |
| 5,974,256 A | * | 10/1999 | Matthews et al. | 717/118 |
| 6,230,318 B1 | * | 5/2001 | Halstead et al. | 717/10 |
| 6,243,709 B1 | * | 6/2001 | Tung | 707/10 |
| 6,523,170 B1 | * | 2/2003 | Cuomo et al. | 717/136 |
| 6,536,035 B1 | * | 3/2003 | Hawkins | 717/100 |

OTHER PUBLICATIONS

Bathelt et al.; "Accessing Embedded Systems via WWW: The ProWeb Toolset", Paper139—TEC154; Dept of Computer Science, University of Erlangen–Nuernberg, Germany; Sixth International World Wide Web Conference, Apr. 1997.*

Zukowski, J.; "Mastering JAVA 2", SYBEX publishing, Chapter 22 "JavaBeans", Copyright 1998.*

Vanhelsuwe, L.; "Mastering JavaBeans", SYBEX publishing, Chapter 6, "Java Archive (JAR) files and API"; Copyright 1997.*

* cited by examiner

Primary Examiner—Marc D. Thompson
(74) Attorney, Agent, or Firm—Seed IP Law Group PLLC (57) ABSTRACT

A system and method for applet management utilizes a dubuild utility to form a core distribution unit and component split distribution units to separately package various features of an application to be downloaded on an as requested basis to a browser running on a client computer from a server computer. To start the application the core distribution unit embedded in a core Hypertext Markup Language (HTML) page is first downloaded from the server computer to the client computer and cached in a designated area of storage on the client computer according to HTML tags. The core distribution unit includes core user features, a background frame, and a component manager. The core user features include a menu supported by the background frame to provide selection of additional features provided by the component split distribution units. Once a user selects a requested feature from the menu provided by other than the core distribution unit, the component manager first determines whether a component split distribution unit has already been downloaded and if not, the component split distribution unit containing the requested feature is downloaded from the server computer to the client computer. Following standard split distribution unit design, the browser caches the component split distribution unit with the core distribution unit as an update to the core distribution unit. Application files of the component split distribution unit then run along with the browser and application files of the core distribution unit to provide the requested features.

44 Claims, 7 Drawing Sheets

SYSTEM AND METHOD FOR APPLET MANAGEMENT

TECHNICAL FIELD

The invention relates generally to distributed computing environments, and more particularly to a server-client environment involving a system and method to manage distribution and allocation of applications, including applets, between servers and client computers.

BACKGROUND OF THE INVENTION

In a computing environment involving server computers and client computers, application processing is distributed and shared among both the server and client computers. Certain applications such as applets are widely used in a distributed computing environment and are generally downloaded from server computers onto client computers where the applications are run and then possibly stored for future use by caching the downloaded application files on the hard disk drive or other storage device of the client computer.

Applets were originally intended to be small sized applications having few files that could be quickly downloaded and used by any client computer equipped with a browser display program configured for particular software languages such as Java. The size of applications such as applets has increased, with applets having more and larger files. Software engineers have found that placing many program functions which provide many user features in one applet as opposed to using many applets with few program functions reduces complexities involved with applet management such as caching, referencing, and initiating applet functions. However, increasing applet size has consequently increased download times to an adverse degree.

A solution to the increased download times has been to package all the applet application files into one compressed file such as a cabinet or jar file for Java class files. The compressed package of files being smaller in size and in one package has reduced download times dramatically for comparably sized applet applications. To accommodate the compressed applet file packages, browsers have been designed to receive and cache compressed file packages such as cabinet files.

Unfortunately, packaging of applet files into one compressed package per applet has caused other problems. In order to use a desired feature of an applet, browsers must download and cache the entire compressed applet package. As a result, even if a user only uses one feature of a multi-featured applet, all files associated with all features of the applet are downloaded and cached by the browser onto the client computer. The many files that never are used needlessly cause delays in downloading and occupying valuable storage space on the client computer. One multi-function applet with its files contained in one compressed package could be broken into many applets, each having their files contained in separate compressed packages; however, the advantages related to applet management gained by grouping many functions under one applet would be lost. For instance, once a number of applets are separately cached, it is difficult to later use all of the applets in a single application.

SUMMARY OF THE INVENTION

The present invention resides in a method and system for secure duplex browser communication over disparate networks. Aspects of the method and system include a communication system comprising a server computer system, a client computer system communicatively linked to the server computer system, a core collection of compressed files, and component collections of compressed files. The server computer system includes a server storage. The client computer system comprises a client storage and a browser program.

More aspects include the browser program being configured to download to the client computer system markup language based pages from the server computer system over the communication network. The browser program is further configured to display information contained in the downloaded markup language based pages, to execute applets contained in the downloaded markup language based pages, and to store files contained in the downloaded markup language based pages on the client storage based upon markup language based tags found on the markup language based pages.

Further aspects include the core collection of compressed files being embedded in a markup language based core page and contains core applet files configured to execute with the browser program on the client computer system to provide features including a menu to select additional features where the menu is displayed by the browser program. The core collection of compressed files further contains markup language based tags with storage details concerning the core collection of compressed files. The storage details include type of storage location in the client storage where the browser program is to store the core collection of compressed files to override default storage details of the browser program. The core collection of compressed files is to be downloaded between the server computer system and the client computer system via the communication network by the browser program.

Other aspects include the component collections of compressed files being embedded in a markup language based component page and containing component files configured to execute with the core collection of compressed files and with the browser program on the client computer system. Each component collection of compressed files are configured to provide one or more of the additional features and contain markup language based tags with storage details concerning that component collection of compressed files.

Additional aspects involve the storage details including type of storage location in the client storage where the browser program is to store the component collection of compressed files to override default storage details of the browser program. The component collection of compressed files is to be downloaded between the server computer system and the client computer system via the communication network by the browser program after selection is made from the menu displayed by the browser program of at least one of the additional features for which the component collection of compressed files is configured to provide.

DESCRIPTION OF THE INVENTION

A system and related method for applet management is described. In the following description, numerous specific details are provided, such as specific types of applications using Java applet class files, and mechanisms for splitting and distributing the Java applets, methods of caching the Java applets, etc., to provide a thorough understanding of embodiments of the invention. One skilled in the relevant art, however, will recognize that the invention can be practiced without one or more of these specific details, or with other types of applications such as other types of applet files, distribution mechanisms, caching methods, etc. In other instances, well-known structures or operations are not shown, or not described in detail, to avoid obscuring aspects of the invention or for brevity.

Figure 1:
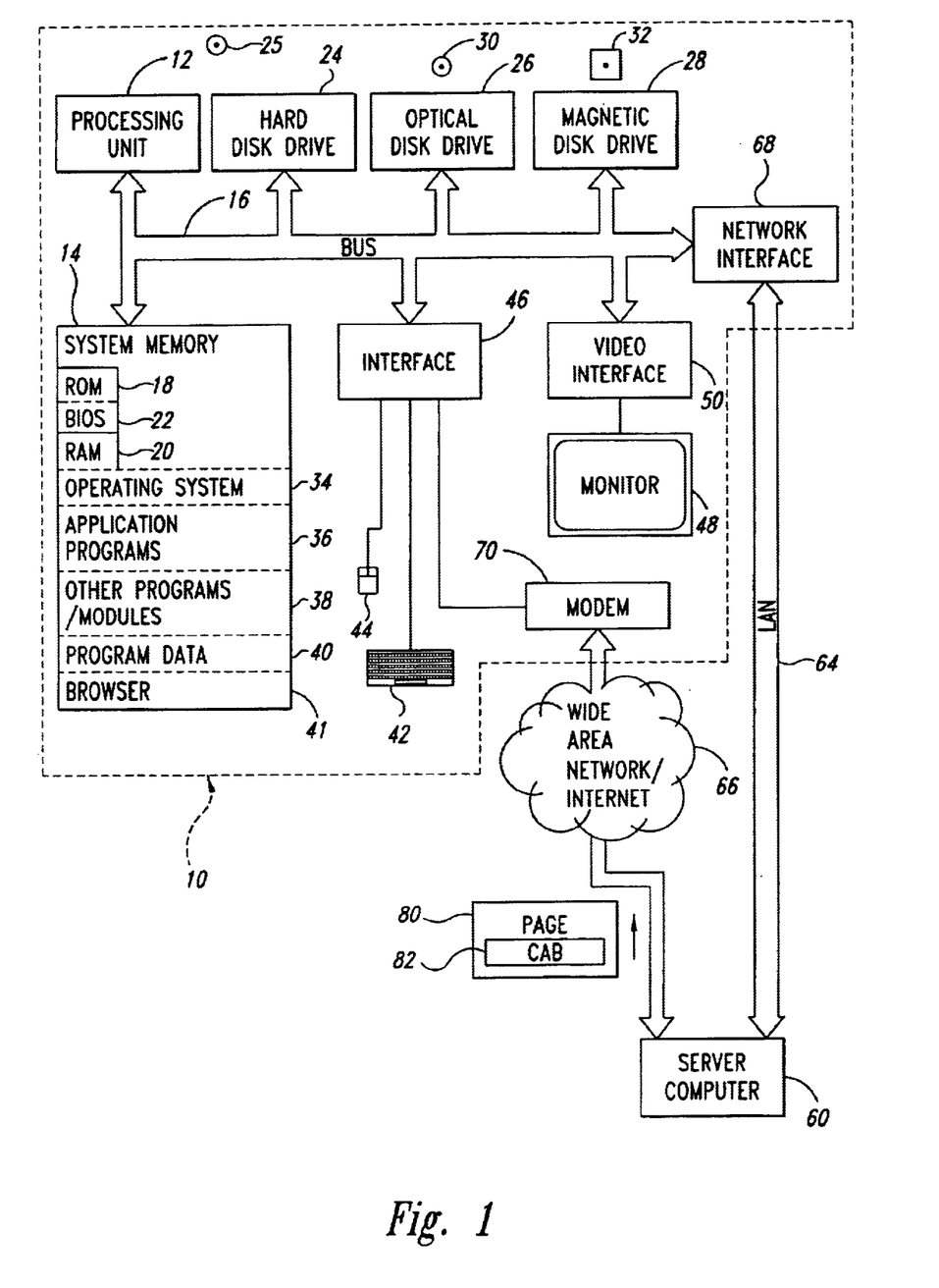
FIG. 1 is a block diagram of a computing system suitable for employing aspects of the invention to store, transmit and display portions of web pages.

FIG. 1 and the following discussion provide a brief, general description of a suitable computing environment in which the invention can be implemented. Although not required, embodiments of the invention will be described in the general context of computer-executable instructions, such as program application modules, objects, or macros being executed by a personal computer. Those skilled in the relevant art will appreciate that the invention can be practiced with other computer system configurations, including hand-held devices, multiprocessor systems, microprocessor-based or programmable consumer electronics, network PCs, mini computers, mainframe computers, and the like. The invention can be practiced in distributed computing environments where tasks or modules are performed by remote processing devices, which are linked through a communications network. In a distributed computing environment, program modules may be located in both local and remote memory storage devices.

Referring to FIG. 1, a conventional personal computer referred herein as a client computer 10 includes a processing unit 12, a system memory 14 and a system bus 16 that couples various system components including the system memory to the processing unit. The processing unit 12 may be any logic processing unit, such as one or more central processing units (CPUs), digital signal processors (DSPs), application-specific integrated circuits (ASIC), etc. Unless described otherwise, the construction and operation of the various blocks shown in FIG. 1 are of conventional design. As a result, such blocks need not be described in further detail herein, as they will be understood by those skilled in the relevant art.

The system bus 16 can employ any known bus structures or architectures, including a memory bus with memory controller, a peripheral bus, and a local bus. The system memory 14 includes read-only memory ("ROM") 18 and random access memory ("RAM") 20. A basic input/output system ("BIOS") 22, which can form part of the ROM 18, contains basic routines that help transfer information between elements within the client computer 10, such as during start-up.

The client computer 10 also includes a hard disk drive 24 for reading from and writing to a hard disk 25, and an optical disk drive 26 and a magnetic disk drive 28 for reading from and writing to removable optical disks 30 and magnetic disks 32, respectively. The optical disk 30 can be a CD-ROM, while the magnetic disk 32 can be a magnetic floppy disk or diskette. The hard disk drive 24, optical disk drive 26 and magnetic disk drive 28 communicate with the processing unit 12 via the bus 16. The hard disk drive 24, optical disk drive 26 and magnetic disk drive 28 may include interfaces or controllers (not shown) coupled between such drives and the bus 16, as is known by those skilled in the relevant art. The drives 24, 26 and 28, and their associated computer-readable media, provide nonvolatile storage of computer readable instructions, data structures, program modules and other data for the client computer 10. Although the depicted client computer 10 employs a hard disk 25, optical disk 30 and magnetic disk 32, those skilled in the relevant art will appreciate that other types of computer-readable media that can store data accessible by a computer may be employed, such as magnetic cassettes, flash memory cards, digital video disks ("DVD"), Bernoulli cartridges, RAMs, ROMs, smart cards, etc.

Program modules can be stored in the system memory 14, such as an operating system 34, one or more application programs 36, other programs or modules 38 and program data 40. The system memory 14 also includes a browser 41 user interface program for permitting the client computer 10 to access and exchange data with web sites of the Internet, corporate intranets, or other networks as described below, as well as legacy host computers as found in the depicted embodiment of the invention. The browser 41 is markup language based, such as Hypertext Markup Language (HTML), and operates with markup languages that use syntactically delimited characters added to the data of a document to represent the structure of the document.

While shown in FIG. 1 as being stored in the system memory 14, the operating system 34, application programs 36, other programs/modules 38, program data 40 and browser 41 can be stored on the hard disk 25 of the hard disk drive 24, the optical disk 30 of the optical disk drive 26 and/or the magnetic disk 32 of the magnetic disk drive 28. A user can enter commands and information into the client computer 10 through input devices such as a keyboard 42 and a pointing device such as a mouse 44. Other input devices can include a microphone, joystick, game pad, scanner, etc. These and other input devices are connected to the processing unit 12 through an interface 46 such as a serial port interface that couples to the bus 16, although other interfaces such as a parallel port, a game port or a universal serial bus ("USB") can be used. A monitor 48 or other display device is coupled to the bus 16 via a video interface 50, such as a video adapter. The client computer 10 can include other output devices, such as speakers, printers, etc.

The client computer 10 can operate in a networked environment using logical connections to one or more remote computers, such as a server computer 60. The server computer 60 can be another personal computer, a server, or other type of computer, and typically includes many or all of the elements described above for the client computer 10. The server computer 60 is logically connected to the client computer 10 under any known method of permitting computers to communicate, such as through a local area network ("LAN") 64 or a wide area network ("WAN") or the Internet 66. Such networking environments are well known in enterprise-wide computer networks, intranets and the Internet.

When used in a LAN networking environment, the client computer 10 is connected to the LAN 64 through an adapter or network interface 68 (coupled to the bus 16). When used in a WAN networking environment, the client computer 10 often includes a modem 70 or other device for establishing communications over the WAN/Internet 66. The modem 70 is shown in FIG. 1 as coupled between the interface 46 and the WAN/Internet 66. In a networked environment, program modules, application programs, or data, or portions thereof, can be stored in the server computer 60. In the depicted embodiment, the client computer 10 is linked to the server computer through the LAN 64 or WAN/Internet 66 with TCP/IP middle layer network protocols and HTTP upper layer network protocols; however, other similar network protocol layers are used in other embodiments. Those skilled in the relevant art will readily recognize that the network connections shown in FIG. 1 are only some examples of establishing communication links between computers, and other links may be used, including wireless links.

In the depicted embodiment, the browser 41 running on the client computer 10 receives web pages 80 with embedded cabinet files 82 over the WAN/Internet 66 from the server computer 60. The cabinet files 82 are packages of compressed class files for Java applets. The Java applets are Java programs based on Hypertext Markup Language (HTML) that can be embedded in Web pages and used across the WAN/Internet 66. Java is an object-oriented programming language, developed by Sun Mircrosystems, Inc., and allows programs to be platform-independent by embedding them in web pages based on HTML. The Java applets provide program functions for web based user features for web pages displayed by the browser 41 such as real-time updating and enhanced interactivity between browser based applications and users.

The Java applets are composed of one or more Java class files, which is the file format for compiled Java code that isn't dependent on a particular platform or implementation. When used with a browser such as Microsoft Internet Explorer, the class files are packaged and compressed into the cabinet files 82. The cabinet files 82 are designed to package one or more Java class files into one compressed cabinet file that is recognizable by Microsoft Internet Explorer 4.0 or above, which is the particular version of the browser 41 used in the depicted embodiment. Under the Sun Microsystems, Inc. approach, class files are compressed and packaged into jar files; however, availability is unknown for browsers with features equivalent to Microsoft's Internet Explorer that recognize the compressed jar format. Although the depicted embodiment uses Java applets with associated class and cabinet files, other embodiments can use other types of files for other applications equivalent to Java applets. The depicted embodiment uses Microsoft Internet Explorer for the browser 41; however, other embodiments can use browsers and applet related utilities other than that used by the depicted embodiment.

In general, Java applets were originally envisioned to be small, one-feature applications that the browser 41 would download from the server 60 to be run temporarily on the hard disk drive 24 during the time an associated web page is open in the browser. Conventional use of applets generally depend upon the default behavior of the browser 41, which may or may not cache the downloaded applets for future use, and may delete cached applets once a space limitation is reached on the hard disk 25. Current implementations can include Java applets that have many class files to provide many program functions for many various user features and many different associated class files. Unfortunately, in the prior art, no matter what the size of a Java applet or what user features provided by the program functions of the Java applet are desired, the Java applet is downloaded from the server 60 to the browser 41 as one archived file (a cabinet file under Microsoft implementation of Java) containing all the Java class files associated with all of the features offered by the Java applet. This results in delays being suffered during downloading and requires additional storage on client computers for class files of program functions for unused user features.

Conventional approaches may suggest a remedy by breaking the large multi-functional applets into many single-function applets; however, assigning each program function to a separate applet can dramatically increase complexities involving applet management. For instance, conventional remedies would greatly expand the number of applets that would have to be separately cached, initiated, and referenced during use of the program functions provided by the applets.

Figures 2A, 2B:
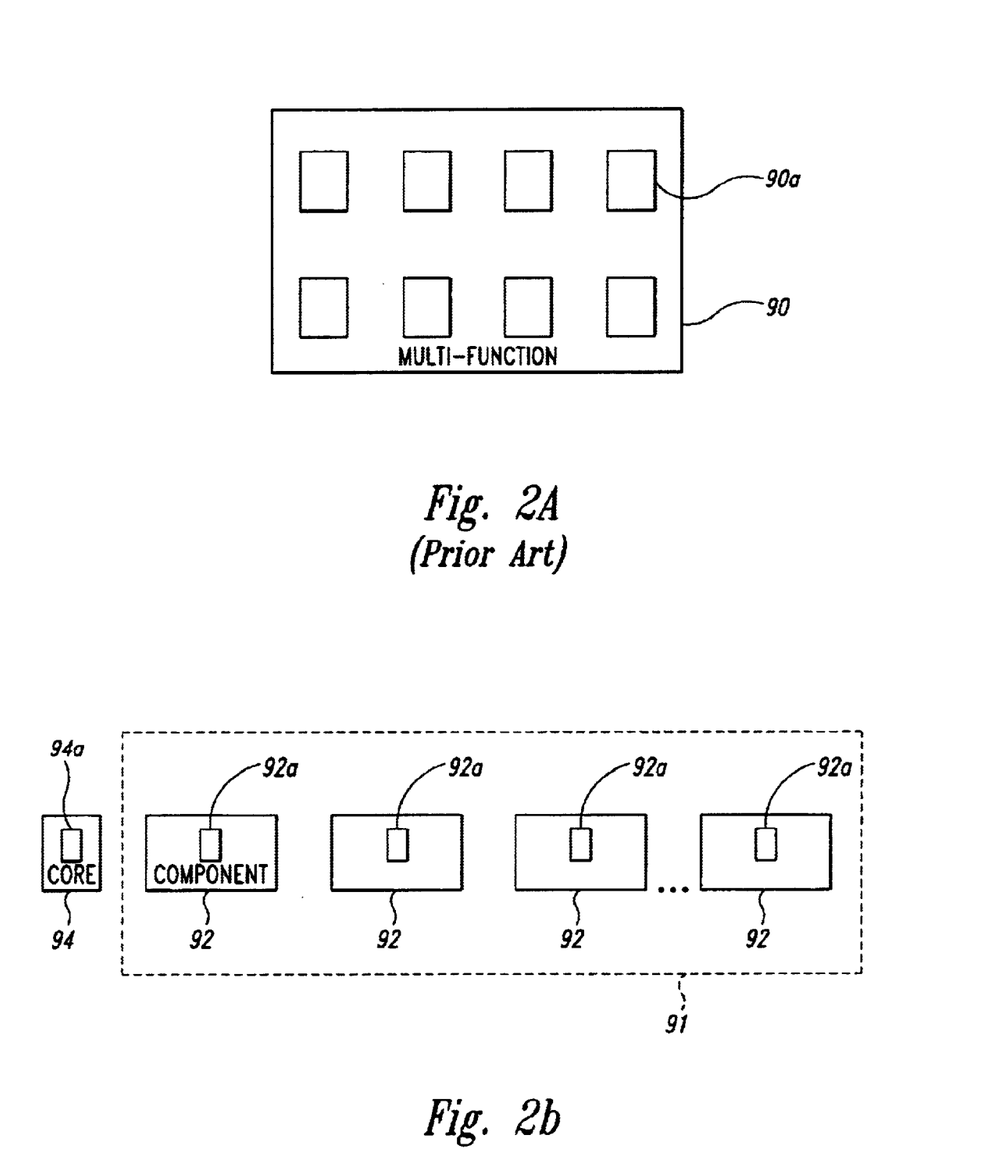
FIG. 2A is a block diagram illustrating a prior art multi-function applet.
FIG. 2B is a block diagram illustrating construction of core and component applets used by the depicted embodiment.

As illustrated in FIGS. 2A and 2B, the depicted embodiment provides a hybrid applet management system that takes a new approach in packaging compressed class files of the Java applets into cabinet files 82 that replaces large multi-functional Java applets 90 (FIG. 2A) with a component collection 91 of component Java applets 92 and a core Java applet 94 (FIG. 2B), while still maintaining a level of management complexity similar to the large multi-functional applets. The component applets 92 of the hybrid applet management system of FIG. 2B can provide one or more program functions and/or user features; however, in the depicted embodiment, emphasis is placed on apportioning program functions and/or user features to as many component applets 92 as possible. In the depicted embodiment, the core applet 94 is designed to be the only stand-alone operational Java program with the component applets 92 being dependent on the core applet 94 for operation. Even though the component applets 92 are not stand-alone operational Java programs, in such operations as downloading and caching, the browser 41 still treats them as Java applets.

Figure 3:
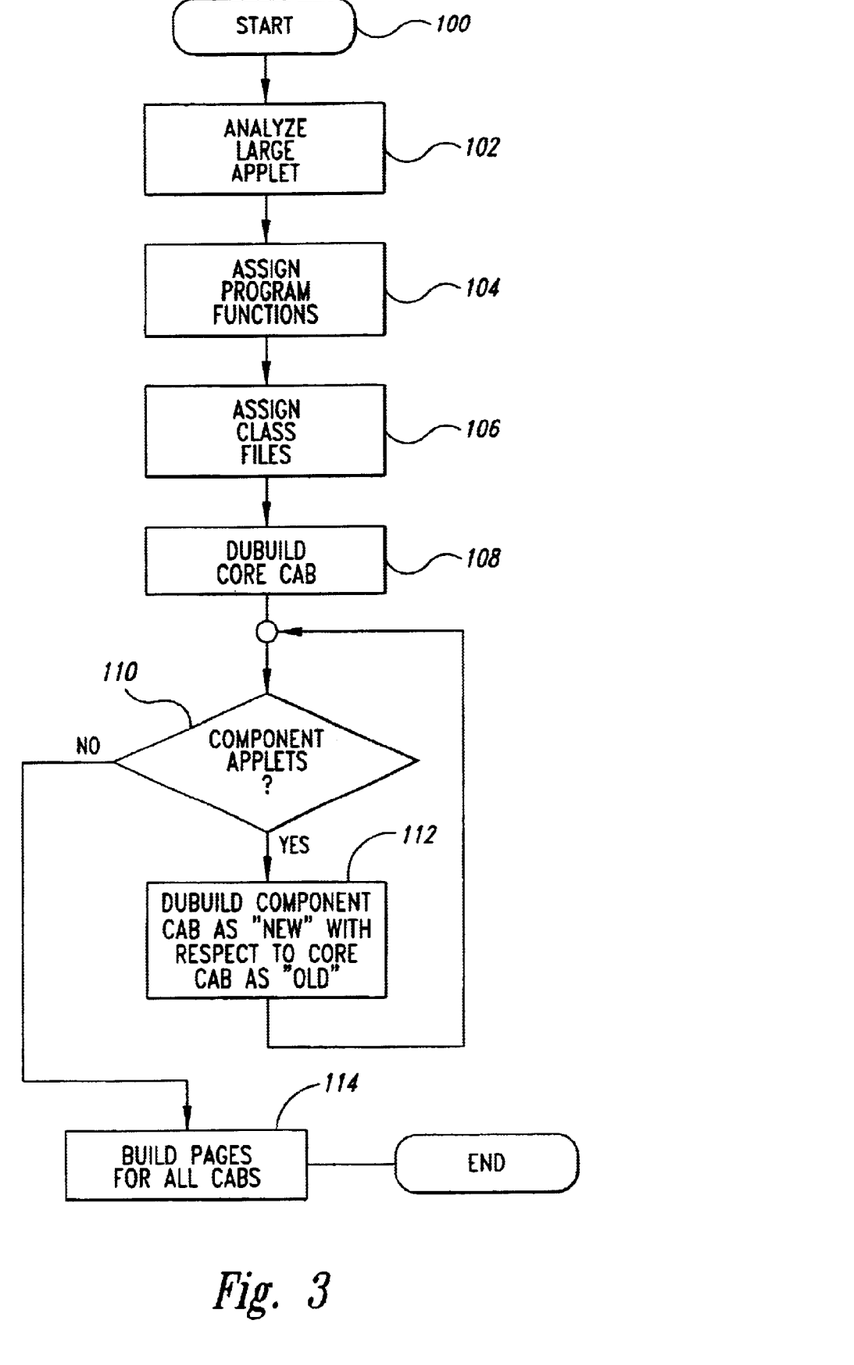
FIG. 3 is a flow chart illustrating a method of construction of core and component applets used by the depicted embodiment.

As an example of implementing the hybrid applet management system, an existing one of the multi-function applets 90 shown in FIG. 2A is first analyzed using the method of FIG. 3 to determine program functions 90a provided by the multi-function applet (step 100 of FIG. 3). Part of this analysis may involve determining which program functions 90a support certain user features. It may be found that one of the program functions 90a supports more than one user feature. Other of the program functions 90a may be exclusively used by a particular user feature. These determinations influence how the program functions 90a of the multi-function applet 90 of FIG. 2A are assigned to the component applets 92 and the core applet 94 of FIG. 2B. As an example, one of the multi-function applets 90 could be a terminal emulation applet and may include program functions 90a such as file transfer, graphical user interface, keyboard, etc.

Based upon the analysis (step 102 of FIG. 3), the program functions 90a of the multi-function applet 90 are assigned as component program functions 92a found in the class files of the component collection 91 of component applets 92 and the core applet 94 (step 104). The core applet 94 is designed to be downloaded from the server computer 60 to be cached on the client computer 10 the first time that any of the component program functions 92a are to be run by the browser 41. Based upon assignment of the program functions 90a to component program functions 92a and core program functions 94a, the particular class files of the multi-function applet 90 are assigned to the various component applets 92 and the core applet 94 (step 106).

The depicted embodiment uses cabinet files, which are collections of compressed files, to package the class files of each of the component applets 92 and the core applet 94 into their own separate cabinet files, which Microsoft Internet Explorer recognizes. Cabinet files allows the core and component applets to be sent across networks in a compressed format thereby saving network bandwidth. Furthermore, the depicted embodiment uses a particular form of cabinet file called a distribution unit. Distribution units allow for distribution of software that is supported by the code download feature of Microsoft Internet Explorer version 4.0 or later, which is used in the depicted embodiment as the browser 41.

A distribution unit is a cabinet file that contains an Open Software Distribution (OSD) manifest file as well as content files (such as class files). The OSD manifest file is written in extensible markup language (XML) and contains details on the version of the distribution unit, the contents of the distribution unit and their versions, and installation instructions for a Java Package Manager. The distribution units are created with a hierarchical directory and installation requirements are handled by Internet Explorer and the Java Package Manager. The distribution is provided through an HTML applet tag and associated parameters, which in the depicted embodiment follows specifications for HTML tags to reference signed cabinet files provided by Microsoft, Inc. The depicted embodiment uses these HTML tags as identification to specify where and how the core applet 94 is downloaded and cached rather than relying on the default behavior of the browser 41. Default behaviors of browsers typically cannot be relied upon to consistently cache applets for an indefinite period since some or all applets may not be cached or may be temporarily cached to be deleted later. The depicted embodiment overrides the default behavior of the browser 41 by using HTML tags to reference the cabinet files. The core applet 94 and the component applets 92 are cached to named space such as an application named space or a global named space to be indefinitely stored on the hard disk 25 until a user initiates deletion of them.

Microsoft SDK for Java includes a utility, dubuild, that writes the OSD file and places it in a cabinet file with the cabinet file contents (such as class files). In addition to building distribution units, the dubuild utility also builds split distribution units used for updating original distribution units. What follows is a general discussion regarding use of the dubuild utility, but is not intended to give detailed instructions, which are available from Microsoft, Inc. The format of dubuild to create an original distribution unit such as "originalcab.cab" would be "dubuild originalcab.cab" where for the cases involving applets, "originalcab.cab" would include class files of an original applet. Using the split distribution feature of the dubuild utility, the original distribution unit, "originalcab.cab" could be updated with a split distribution unit such as "update.cab."

The format for the dubuild utility for creating a split distribution unit "update.cab" that would update the original distribution unit "originalcab.cab" would be generally, "dubuild update.cab original.cab." If Microsoft Internet Explorer has downloaded and cached "original.cab," onto the hard disk drive then upon downloading "update.cab," Microsoft Internet Explorer would update the files of the original "original.cab" distribution unit, including the class files, by either deleting or replacing original class files or adding new class files to the "original.cab" distribution unit. Microsoft Internet Explorer does not retain references to the "update.cab" split distribution unit for caching purposes, so once the update is accomplished Microsoft Internet Explorer is only able to retrieve the updated "original.cab" distribution unit.

In general, before Microsoft Internet Explorer downloads a cabinet file, Microsoft Internet Explorer checks whether the friendly name of the cabinet file is already registered and that the version of the cabinet file to be downloaded matches what is in the Microsoft Internet Explorer register. If both the cabinet file name and version matches what is in the Microsoft Internet Explorer register, then Microsoft Internet Explorer does not download the cabinet file, but rather runs the cabinet file that is already cached on the client computer 10. If there is no match, both the original distribution unit cabinet file and any split distribution unit that updates the original distribution unit cabinet file are downloaded and cached by Microsoft Internet Explorer. If Microsoft Internet Explorer detects that an older version of the cabinet file is cached on the client computer 10, then only the update split distribution cabinet file is downloaded.

Figure 4:
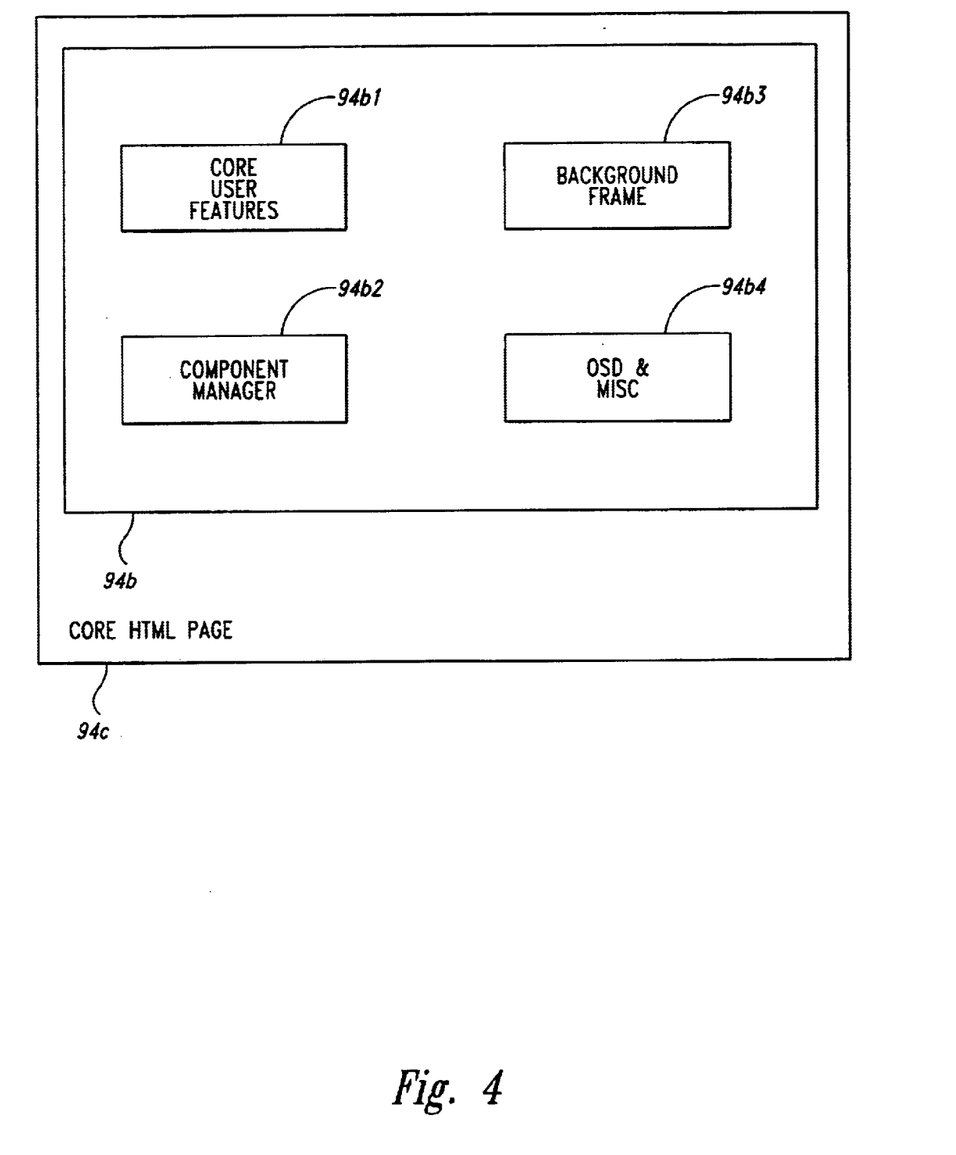
FIG. 4 is a block diagram showing detail of a core HTML page used by the depicted embodiment.

After the class files are assigned (step 106), a core distribution unit 94b, as shown in FIG. 4, such as "core.cab" for the core applet 94 is built (step 108) as an original distribution unit using the dubuild utility with the class files assigned to the core applet. The general format used for the dubuild utility to build the core distribution unit 94b (such as "core.cab") as an original distribution unit is "dubuild core.cab." After the core distribution unit 94b is built, the implementation procedure determines if any of the component applets 92 of the component collection 91 do not have an associated component split distribution unit 92b, as shown in FIG. 3, (step 110) and if so, the dubuild utility is used to build a component split distribution unit 92b for one of the component applets not having a component split distribution unit (step 112). Further component split distribution units 92b are made (steps 110 and 112) until all the component applets 92 of the component collection 91 have associated component split distribution units at which point decision step 110 branches on "No" to step 114.

Component split distribution units 92b (FIG. 5) associated with the component collection 91 differ from the core distribution unit 94b (FIG. 4) associated with the same component collection in that the component distribution units are built using the dubuild utility as split distribution units with the core distribution unit as the original distribution unit of the split distribution units. Thus, one of the component split distribution units 92b, such as "component.cab," would be built with the dubuild utility with respect to the core distribution unit 94b, such as "core.cab," using the general format "dubuild component.cab core.cab."

After the core distribution unit 94b is built for the core applet 94 and the associated component split distribution units 92b are built for the component applets 92 of the component collection 91, a core HTML page 94c (see FIG. 4) is built for the core distribution unit 94b and a component HTML page 94c (see FIG. 5) is built for each of the component distribution units (step 114). After this step, the method illustrated in FIG. 3 ends. The core distribution unit 94b is embedded into the core HTML page 94c and each component split distribution unit 92b associated with the component collection 91 of component applets 92 are embedded into their own separate component HTML page 92c so that the distribution units can be downloaded and cached by the browser 41 of the client computer 10 when requested. In the depicted embodiment, HTML tags are modified according to Microsoft, Inc. guidelines to allow Microsoft Internet Explorer to download the core HTML page 94c and the component HTML pages 92c when selected by the user to cache the core distribution unit 94b and the component split distribution units 92b in named space on the hard disk drive 24 of the client computer 10.

As illustrated in FIG. 4, the core distribution unit 94b contains code and instructions including core user feature class files 94b1 directed to the core program functions 94a that support core user features that would have been used by every user of the multi-function applet 90. The core distribution unit 94b also includes class files for a component manager 94b2, a background frame 94b3, and other miscellaneous class files and the OSD 94b4.

Figure 5:
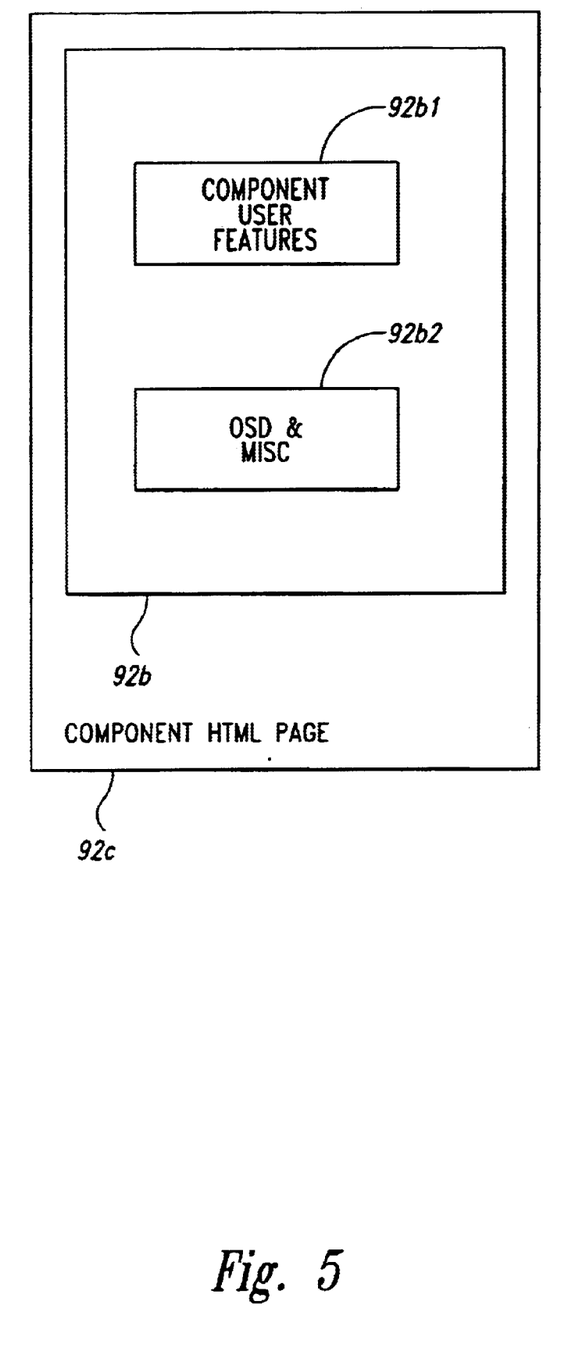
FIG. 5 is a block diagram showing detail of a component HTML page used by the depicted embodiment.

As illustrated in FIG. 5, the component split distribution units 92b contain code and instructions including component user feature class files 92b1 directed to the component program functions that support component user features to be used as desired by individual users but would not be necessarily used by every user of the multi-function applet 90. The component split distribution units 92b also include class files for other miscellaneous purposes and the OSD 92b2.

In operation, a user will first make a application request (step 122 of FIG. 6A) by indicating a general desire to use some aspect of finctionality provided by the core applet 94 and/or one of the component applets 92 by input to the client computer 10 with a device such as the mouse 44 and/or the keyboard 42. To satisfy the application request, the browser 41 first checks if the core applet 94 is already cached (step 124) and if not downloads the core applet (step 126) by downloading the core HTML page 94c containing the core distribution unit 94b. The browser then caches the core applet 94 according to associated HTML tags and initiates operation of the core applet. Upon operation, the core applet 94 starts the background frame 94b3 running as a background process to provide support for a user interface menu as displayed on the monitor 48 of the client computer 10 and the component manager 94b2 of the core distribution unit 94b. In the depicted embodiment, the user interface menu allows selection of the core user features 94b1 provided by the core applet 94 as well as selection of other features provided by the component applets 92. In operation, if the core user features 94b1 of the core applet 94 are not sufficient, the user will then make a feature request (step 128) with respect to a desired feature through input with the user interface menu as displayed on the monitor 48 of the client computer 10.

Figure 6A:
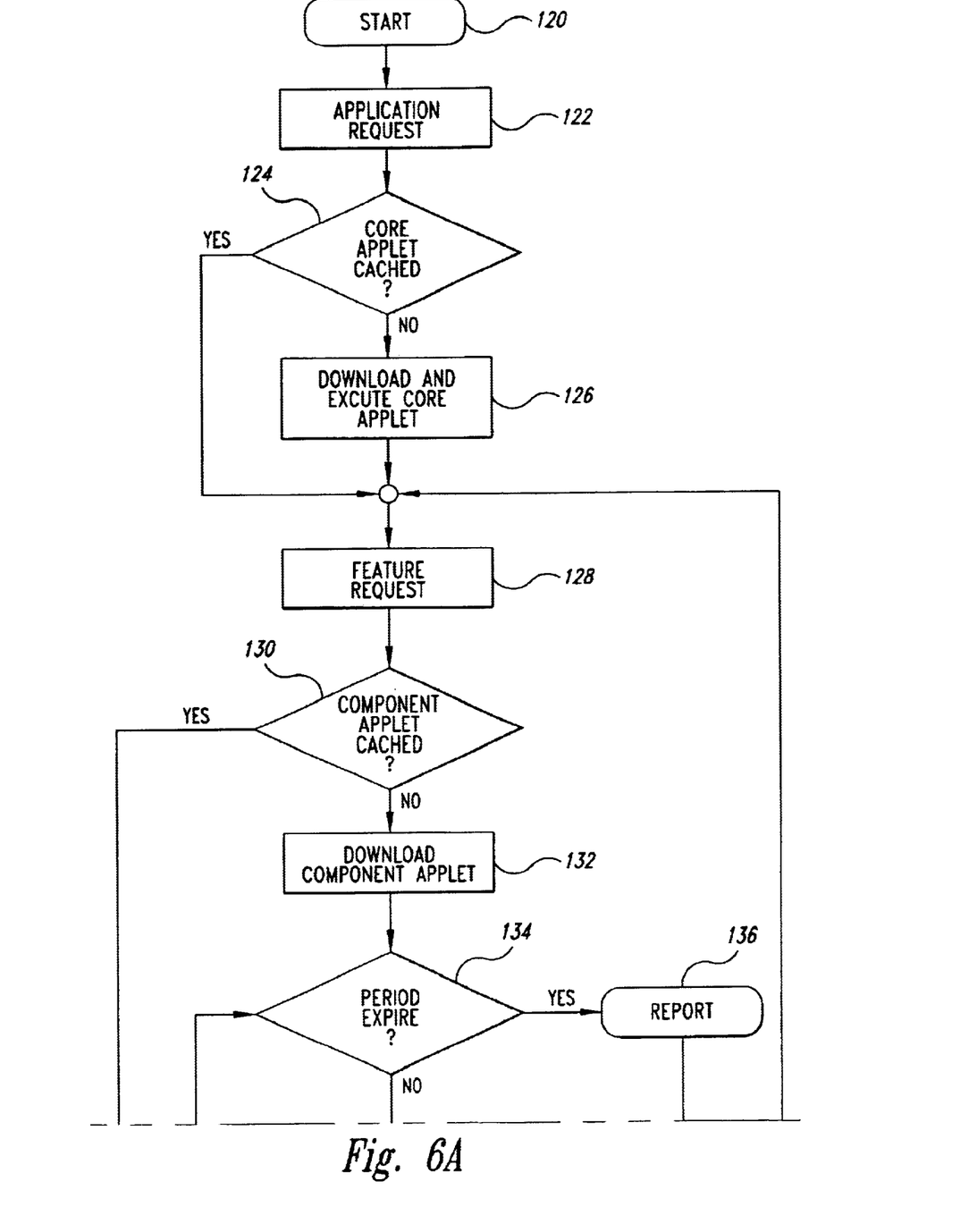
FIGS. 6A and 6B form a flow chart illustrating operational detail of the depicted embodiment.

In response to the feature request, the component manager 94b2 of the core applet 94 checks whether the particular component applet 92 associated with the feature request is already cached (step 130), and if not, instructs the browser to download the component HTML page 92c containing the component split distribution unit 92b for the particular component applet 92 (step 132). Following split distribution unit protocol, the browser 41 treats the class files contained in the component split distribution unit 92b of the particular component applet 92 as updates to the core applet 94, so the browser caches these component applet class files in the same named space that contains the class files of the core applet.

Figure 6B:
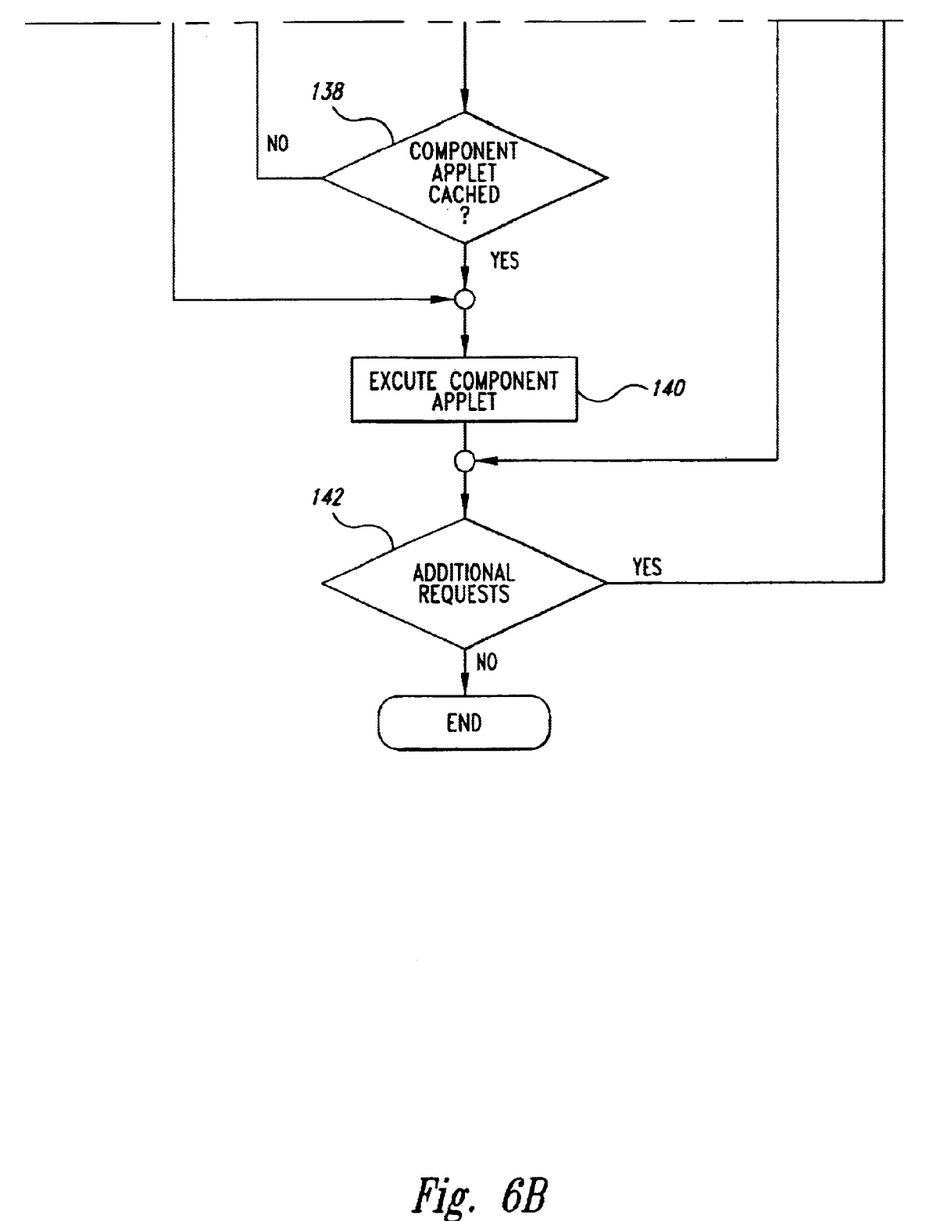

The class files of the core applet 94 and the component applets 92 are cached in the same named space and are treated at that point as belonging to the same updated core applet. Therefore, when checking whether the particular component applet 92 has been cached, the component manager 94b2 must check a particular marker such as whether particular class files associated with the particular component applet exist in the named space. As the class files of the component split distribution unit 92b of the particular component applet 92 are downloaded and cached as an update to the core applet 94, the component manager 94b2 monitors the time elapsed (step 134) since the download component applet request (step 132) and issues a report (step 136) if a predetermined time has expired before the component applet has been downloaded. During the predetermined time after the component applet download request, the component manager 94b2 continues to check whether the requested component applet 92 is cached, branching back to step 134 if it is not yet cached, (step 138 of FIG. 6B) and initiates operation of the component applet (step 140) if the component manager detects that the component applet has been cached. Any requests (step 142) for additional features undergo treatment similar (starting at step 128) to that received by the initial feature request.

From the foregoing it will be appreciated that, although specific embodiments of the invention have been described herein for purposes of illustration, various modifications may be made without deviating from the spirit and scope of the invention. Accordingly, the invention is not limited except as by the appended claims.

It is claimed:

1. A communication system comprising:

a server computer system including a server storage;

a client computer system communicatively linked to the server computer system via a communication network, the client computer system comprising:

a client storage;

a browser program, the browser program configured to download to the client computer system markup language based pages from the server computer system over the communication network, to display information contained in the downloaded markup language based pages, to execute applets contained in the downloaded markup language based pages, and to store files contained in the downloaded markup language based pages on the client storage based upon markup language based tags found on the markup language based pages;

a core collection of compressed files being embedded in a markup language based core page, the core collection of compressed files containing core applet files configured to execute with the browser program on the client computer system to provide one or more features including a menu to select additional features, the menu to be displayed by the browser program, the core collection of compressed files further containing markup language based tags with storage details concerning the core collection of compressed files, the storage details including type of storage location in the client storage where the browser program is to store the core collection of compressed files to override default storage details of the browser program, the core collection of compressed files to be downloaded between the server computer system and the client computer system via the communication network by the browser program; and component collections of compressed files, each component collection of compressed files being embedded in a markup language based component page and containing component applet files configured to execute with the core collection of compressed files and with the browser program on the client computer system, each component collection of compressed files configured to provide one or more of the additional features, each component collection of compressed files containing markup language based tags with storage details concerning that component collection of compressed files, the storage details including type of storage location in the client storage where the browser program is to store the component collection of compressed files to override default storage details of the browser program, the component collection of compressed files to be downloaded between the server computer system and the client computer system via the communication network by the browser program after selection is made from the menu displayed by the browser program, at least one of the additional features for which the component collection of compressed files is configured to provide.

2. The communication system of claim 1 wherein the core collection of compressed files is a cabinet file and the compressed files thereof are Java class files.

3. The communication system of claim 1 wherein the component collection of compressed files is a cabinet file and the compressed files thereof are Java class files.

4. The communication system of claim 1 wherein the storage location for the storage details of the file identification of the core collection of compressed files is an application named space and the storage location for the storage details of the file identification of the component collections of compressed files is the same application named space as that for the storage details of the core collection of the compressed files.

5. The communication system of claim 1 wherein the core collection of compressed files is a distribution unit file.

6. The communication system of claim 1 wherein the component collection of compressed files is a split distribution unit.

7. The communication system of claim 1 wherein the core applet files are configured to execute a background frame to support the menu.

8. The communication system of claim 1 wherein the core applet files are further configured to execute a component manager to check for one or more designated markers, such as class files, being stored in the client storage, before one of the component collection of compressed files is downloaded from the server computer system to the client computer system via the communication system by the browser program.

9. A communication system comprising:
a server computer system including a server storage;
a client computer system communicatively linked to the server computer system via a communication network, the client computer system comprising:
a client storage;
a graphical user interface, the graphical user interface configured to download files from the server computer system over the communication network, to display information contained in the downloaded files, to execute applications contained in the downloaded files, and to store the downloaded files on the client storage based upon file identification;
a core collection of compressed files containing core application files configured to execute with the graphical user interface on the client computer system to provide one or more features including a menu to select additional features, the menu to be displayed by the graphical user interface, the core collection of compressed files further containing file identification with storage details concerning the core collection of compressed files, the storage details including type of storage location in the client storage where the graphical user interface is to store the core collection of compressed files to override default storage details of the graphical user interface, the core collection of compressed files to be downloaded between the server computer system and the client computer system via the communication network by the graphical user interface; and
component collections of compressed files containing component files configured to execute with the core collection of compressed files and with the graphical user interface on the client computer system, each component collection of compressed files configured to provide one or more of the additional features, each component collection of compressed files containing file identification with storage details concerning that component collection of compressed files, the storage details including type of storage location in the client storage where the graphical user interface is to store the component collection of compressed files to override default storage details of the graphical user interface, the component collection of compressed files to be downloaded between the server computer system and the client computer system via the communication network by the graphical user interface after selection is made from the menu displayed on the graphical user interface of at least one of the additional features for which the component collection of compressed files is configured to provide.

10. The communication system of claim 9 wherein the file identification is one or more Hypertext Markup Language tags.

11. The communication system of claim 9 wherein the graphical user interface is a browser program.

12. The communication system of claim 9 wherein the core collection of compressed files is a cabinet file and the compressed files are Java class files.

13. The communication system of claim 9 wherein the component collection of compressed files is a cabinet file and the compressed files are Java class files.

14. The communication system of claim 9 wherein the storage location for the storage details of the file identification of the core collection of compressed files is a named space and the storage location for the storage details of the file identification of the component collections of compressed files is the same named space as that for the storage details of the file identification of the core collection of the compressed files.

15. The communication system of claim 9 wherein the core collection of compressed files is downloaded between the server computer system and the client computer system by being embedded into a markup language page.

16. The communication system of claim 9 wherein the component collections of compressed files are each embedded into a markup language page to be downloaded from the server computer system to the client computer system.

17. The communication system of claim 9 wherein the core application files are configured to form an applet.

18. The communication system of claim 9 wherein each component collection of compressed files is configured to form one or more applets.

19. The communication system of claim 9 wherein the core collection of compressed files is a distribution unit file and the compressed files thereof are Java class files.

20. The communication system of claim 9 wherein the component collection of compressed files is a split distribution unit and the compressed files thereof are Java class files.

21. The communication system of claim 9 wherein the core application files are configured to execute a background frame to support the menu.

22. The communication system of claim 9 wherein the core application files are further configured to provide a component manager, the component manager being configured to check for one or more designated markers, such as class files, being stored in the client storage, before one of the component collection of compressed files is downloaded from the server computer system to the client computer system via the communication system by the graphical user interface.

23. The communication system of claim 9 wherein the communication network is either an internet or an intranet.

24. A client computer system for use with a server computer system, the server computer system communicatively linked to the client computer system via a communication network, the client system comprising:
 a client storage;
 a graphical user interface, the graphical user interface configured to download files from the server computer system over the communication network, to display information contained in the downloaded files, to execute applications contained in the downloaded files, and to store the downloaded files on the client storage based upon file identification;
 a core collection of compressed files containing core application files configured to execute with the graphical user interface on the client computer system to provide one or more features including a menu to select additional features, the menu to be displayed by the graphical user interface, the core collection of compressed files further containing file identification with storage details concerning the core collection of compressed files, the storage details including type of storage location in the client storage where the graphical user interface is to store the core collection of compressed files to override default storage details of the graphical user interface, the core collection of compressed files to be downloaded between the server computer system and the client computer system via the communication network by the graphical user interface; and
 one or more component collections of compressed files configured to execute with the core collection of compressed files and with the graphical user interface on the client computer system, each component collection of compressed files configured to provide one or more of the additional features, each component collection of compressed files containing file identification with storage details concerning that component collection of compressed files, the storage details including type of storage location in the client storage where the graphical user interface is to store the component collection of compressed files to override default storage details of the graphical user interface, the component collection of compressed files to be downloaded between the server computer system and the client computer system via the communication network by the graphical user interface after selection is made from the menu displayed on the graphical user interface of at least one of the additional features for which the component collection of compressed files is configured to provide.

25. The client computer system of claim 24 wherein the file identification is one or more Hypertext Markup Language tags.

26. The client computer system of claim 24 wherein the graphical user interface is a browser program.

27. The client computer system of claim 24 wherein the core and component collections of compressed files are cabinet files.

28. The client computer system of claim 24 wherein the core and component collections of compressed files are downloaded between the server computer system and the client computer system by being embedded into markup language pages.

29. The client computer system of claim 24 wherein the core and component collections of compressed files are configured to form applets.

30. The client computer system of claim 24 wherein the core collection of compressed files is a distribution unit and the component collection of compressed files is a split distribution unit.

31. The client computer system of claim 24 wherein the core application files are configured to execute a background frame to support the menu.

32. A server computer system for use with a client computer system, the client computer system having a graphical user interface and a client storage, the client system communicatively linked to the server system via a communication network, the server system comprising:
 a server storage;
 a core collection of compressed files containing core application files configured to execute with the graphical user interface on the client computer system to provide one or more features including a menu to select additional features, the menu to be displayed by the graphical user interface, the core collection of compressed files further containing file identification with storage details concerning the core collection of compressed files, the storage details including type of storage location in the client storage where the graphical user interface is to store the core collection of compressed files to override default storage details of the graphical user interface, the core collection of compressed files to be downloaded between the server computer system and the client computer system via the communication network by the graphical user interface; and
 component collections of compressed files configured to execute with the core collection of compressed files and with the graphical user interface, each component collection of compressed files configured to provide one or more of the additional features, each component collection of compressed files containing file identification with storage details concerning that component collection of compressed files, the storage details including type of storage location in the client storage where the graphical user interface is to store the component collection of compressed files to override default storage details of the graphical user interface, the component collection of compressed files to be downloaded between the server computer system and the client computer system via the communication network by the graphical user interface after selection is made from the menu displayed on the graphical user interface of at least one of the additional features for which the component collection of compressed files is configured to provide.

33. The server computer system of claim 32 wherein the core collection and component collections of compressed files are configured to be downloaded by the graphical user interface operating as a browser program.

34. The server computer system of claim 32 wherein the core and the component collections of compressed files are cabinet files and the compressed files thereof are Java class files.

35. The server computer system of claim 32 wherein the core collection and component collections of compressed files are embedded into markup language pages.

36. The server computer system of claim 32 wherein the core and component collections of compressed files are configured to form applets.

37. A computer-readable medium for storing computer-readable instructions, the instructions written to program a computer to perform a method, the method comprising:
   receiving a core collection of compressed files having core application files onto a client computer;
   caching onto one or more designated locations of a storage of the client computer, the core collection of compressed files according to identification associated with the core collection of compressed files;
   uncompressing one or more core application files from the core collection of compressed files onto the client computer;
   executing the one or more of the uncompressed core application files from the core collection of compressed files to display a menu to select one or more features;
   determining whether a marker associated with a selection of one or more features from the menu exists on the storage of the client computer;
   if the marker has been determined not to exist on the storage of the client computer, then receiving a component collection of compressed files having component application files onto the client computer based upon the selection of one or more features from the menu;
   caching along with the core collection of compressed files onto the one or more designated locations of the storage of the client computer, the component collection of compressed files according to identification associated with the component collection of compressed files;
   uncompressing one or more of the component application files from the component collection of compressed files onto the client computer; and
   executing the one or more of the uncompressed component application files from the component collection of compressed files to provide the one or more features as selected from the menu.

38. The computer-readable medium with the method of claim 37 wherein caching, uncompressing, and executing the one or more component application files from the component collection of compressed files is done as an update to the core collection of compressed files.

39. Computer files stored on a computer-readable medium, the computer files comprising:
   a core collection of compressed files containing core application files configured to execute with a graphical user interface on a client computer to provide one or more features including a menu to select additional features, the menu to be displayed by the graphical user interface, the core collection of compressed files further containing file identification with storage details concerning that core collection of compressed files, the storage details including type of storage location in a client storage of the client computer where the graphical user interface is to store the core collection of compressed files to override default storage details of the graphical user interface, the core collection of compressed files configured for download between a server computer and the client computer via a communication network by the graphical user interface; and
   component collections of compressed files configured to execute with the core collection of compressed files and with the graphical user interface on the client computer system, each component collection of compressed files configured to provide one or more of the additional features, each component collection of compressed files containing file identification with storage details concerning that component collection of compressed files, the storage details including type of storage location in the client storage where the graphical user interface is to store the component collection of compressed files to override default storage details of the graphical user interface, the component collection of compressed files to be downloaded between the server computer and the client computer via the communication network by the graphical user interface after selection is made from the menu displayed on the graphical user interface of at least one of the additional features for which the component collection of compressed files is configured to provide.

40. The computer files of claim 39 wherein the core and component collections of compressed files include Java class files.

41. A method for providing an application containing features to a graphical user interface running on a client computer from a server computer, the method comprising:
   downloading a core collection of compressed files;
   uncompressing one or more files of the downloaded core collection of compressed files;
   executing the one or more uncompressed files of the core collection of compressed files to provide a menu of feature selections;
   selecting a feature from the menu;
   downloading a component collection of compressed files in response to selecting the selected feature from the menu;
   uncompressing one or more files of the downloaded component collection of compressed files; and
   executing the one or more uncompressed files of the component collection of compressed files along with the one or more uncompressed files of the core collection of compressed files to provide the selected feature.

42. The method of claim 41, further comprising after selecting the selected feature, determining whether the component collection of compressed files has been already downloaded.

43. A method of forming an application having features to run with a graphical user interface on a client computer, the method comprising:
   making a core collection of compressed files to run with the graphical user interface as a stand-alone application in an uncompressed state and to display a menu on the graphical user interface, the menu providing feature selections;
   making component collections of compressed files, each component collection of compressed files to run in an uncompressed state with the uncompressed files of the core collection of compressed files and the graphical user interface to provide one or more of the features associated with the feature selections of the menu; and
   storing the core and component collections of compressed files on a server computer to be downloaded in separate downloads to the client computer.

44. The method of claim 43 wherein the core collection of compressed files is a distribution unit made with a dubuild utility and the component collections of compressed files are split distribution units.

* * * * *